Dec. 31, 1946.    H. A. WHEELER    2,413,609
TIME DELAY NETWORK
Filed March 12, 1945
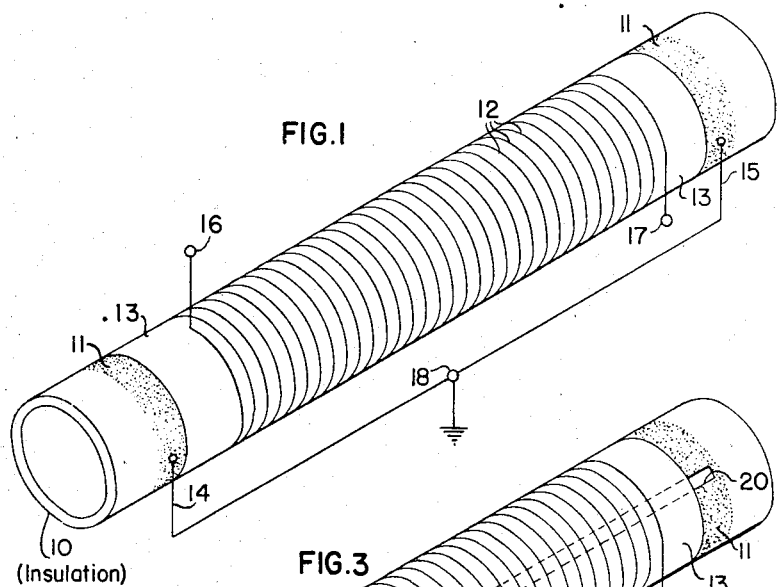
FIG.1
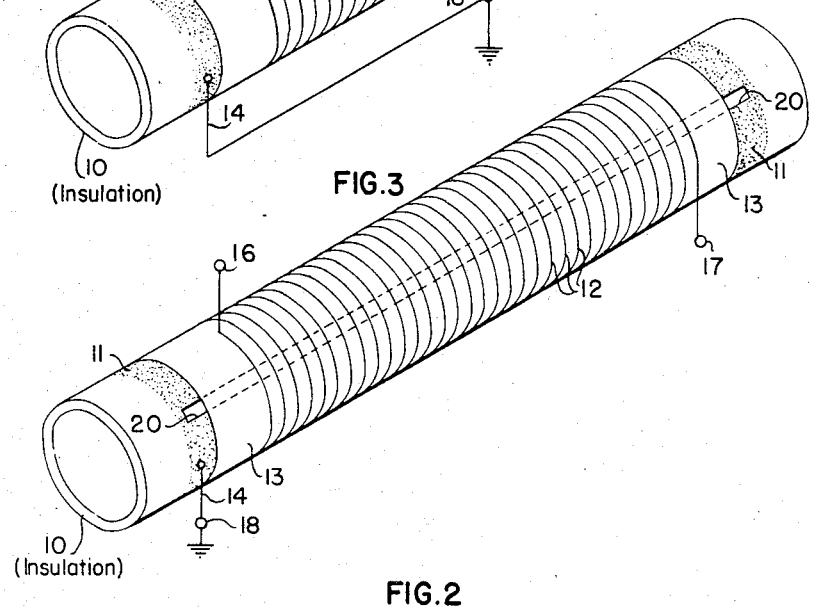
FIG.3
FIG.2
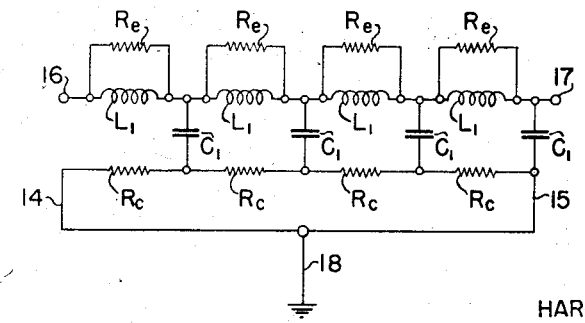
*INVENTOR.*
HAROLD A. WHEELER
BY *Harry C. Page*
ATTORNEY Patented Dec. 31, 1946

2,413,609

UNITED STATES PATENT OFFICE 2,413,609

TIME-DELAY NETWORK

Harold A. Wheeler, Great Neck, N. Y., assignor, by mesne assignments, to Hazeltine Research, Inc., Chicago, Ill., a corporation of Illinois Application March 12, 1945, Serial No. 582,285

9 Claims. (Cl. 178—44)

1

This invention is directed to time-delay networks of the unbalanced or three-terminal type for translating signal components included within a predetermined range of frequencies. It is related to the delay networks disclosed in copending applications, Serial No. 582,284, and Serial No. 582,283, filed concurrently on March 12, 1945, in the name of Michael J. Di Toro and assigned to the same assignee as the present invention.

Time-delay networks, as such, have long been known in the art and have taken the form of a balanced or unbalanced circuit. A balanced delay network of the prior art may comprise a pair of similar distributed windings coaxially wound about a common supporting core structure but with opposed pitches to contribute to the network uniformly distributed inductance and capacitance. The physical characteristics of the windings, such as dimensions, number of turns per unit length, and conductor size, determine the total time delay of the network. The losses and imperfections of the windings determine the attenuation and the pass-band characteristics of the network. While such prior art time-delay networks have proved to be operative, they are subject to certain inherent limitations which may be undesirable in particular installations. For example, the arrangement is susceptible to two distinctly different modes of operation: (1) balanced or normal operation wherein the currents in corresponding portions of its windings are out of phase; and (2) unbalanced or abnormal operation wherein the currents in corresponding portions of its windings are in phase. Additionally, a balanced circuit is generally required for transferring signal energy to or from the network.

An unbalanced delay network of the prior art may comprise a single distributed winding and a ground return. The ground return is usually provided by a slotted metal tube which also serves as a supporting core structure for the winding. The capacitance between the winding and its core structure supplies the distributed capacitance of the network which, together with the inductance of the winding, determines the total time delay. A particular time delay may be obtained by appropriately selecting the physical characteristics of the winding and its core structure. Such an arrangement is subject to but a single mode of operation, and an unbalanced circuit may be utilized for transferring energy with reference thereto. To this extent, the unbalanced delay network is more desirable than the described balanced arrangement. However, such unbalanced networks of the prior art have been subject to

2 serious loss problems. For example, the eddy-current loss in the core structure has been severe since the core structure is closely positioned with reference to a large portion of the surface of the winding in order to furnish the desired distributed capacitance in the network. Additionally, it is found that the core structure shields the magnetic field of the winding and reduces the inductance of the network.

It is an object of the invention, therefore, to provide an improved time-delay network for translating signal components included within a predetermined range of frequencies and which avoids one or more of the above-mentioned limitations of prior-art arrangements.

It is another object of the invention to provide an improved time-delay network of the unbalanced or three-terminal type for translating signal components over a predetermined range of frequencies with minimum attenuation obtained by optimum proportions in design.

It is a further object of the invention to provide an improved time-delay network for translating signal components included within a predetermined range of frequencies and adapted to produce relatively long time delays.

In accordance with the invention, a time-delay network for translating signal components included within a predetermined range of frequencies comprises an elongated structure including a conductive material. The network also comprises an elongated winding insulated from but electrically coupled along its length to the structure to provide in the network a distributed capacitance comprising the capacitance between the structure and the winding, this capacitance determining in conjunction with the inductance of the winding the time delay of the network. The conductive material of the elongated structure has such conductivity and constitutes such portion of the structure that the eddy-current losses in the conductive material are approximately equal to the conduction-current losses thereof at the mid-frequency of the aforementioned range of frequencies.

For a better understanding of the present invention, together with other and further objects thereof, reference is had to the following description taken in connection with the accompanying drawing, and its scope will be pointed out in the appended claims.

In the drawing, Fig. 1 is a schematic representation of an unbalanced time-delay network in accordance with the present invention; Fig. 2 is a schematic circuit diagram utilized in discussing the attenuation properties of the Fig. 1 arrangement; while Fig. 3 illustrates a modification of the time-delay network of Fig. 1.

Referring now more particularly to Fig. 1, there is represented schematically an unbalanced or three-terminal time-delay network for translating signal components included within a predetermined range of frequencies. This network is in the form of a simulated transmission line and comprises an elongated supporting core structure including a conductive material. More specifically, the core structure includes a tubular member 10 of insulating material having a thin peripheral coating 11 of conductive material over a major portion of its outer circumference. Tubular member 10 may consist of a formed tube of thermoplastic resin, a glass tube or rod, or any similar insulating material formed into a supporting core of any desired cross-sectional configuration. The conductive coating 11 may be a high-resistance metallized film bonded to insulating member 10, and may include such materials as silver, gold, or graphite deflocculated in water.

The network also includes an elongated or distributed winding 12 wound around the coated portion of the described core structure to be mechanically supported thereby. The winding is insulated from the conductive coating of its supporting core structure by an insulating sleeve or tape 13, although this insulation may be omitted where the insulation of the winding 12 has sufficiently high dielectric properties. Due to the inherent capacitance between winding 12 and the conductive coating 11 of the core structure, the winding is coupled along its length to the core structure to provide in the delay network a distributed capacitance, namely, the capacitance between the core structure and the winding. This capacitance, in conjunction with the inductance of winding 12, determines the time delay of the network since, in any such network, the total time delay is proportional to the geometric mean of its total inductance and total capacitance. The diameter and length of core structure 10, the size and type of conductor utilized in fabricating winding 12, and the number and pitch of the winding convolutions are selected to afford such desired values of inductance and capacitance that the network produces a certain total time delay. In this connection, it will be appreciated that an increase in the diameter or length of the core structure and winding results in higher values of inductance and capacitance, while increasing the number of turns per unit length of the winding increases primarily only the inductance.

The time-delay network further includes means, having a substantially lower impedance than the core structure and connected thereto at a plurality of points, for providing a low-impedance path to a common terminal, usually ground, from the structure. This means is shown as connections 14 and 15 extending from a common or ground terminal 18 and connecting with conductive coating 11 near the opposite ends of winding 12. Each connector 14 and 15 may comprise a silver-plated conductive strap having a substantially lower impedance than the conductive coating 11. An input terminal 16, for applying signals to the network, is coupled to one end of winding 12, and an output terminal 17, for deriving delayed signals therefrom, is connected to the opposite end of the winding.

The described arrangement will be seen to constitute an unbalanced or three-terminal network. It is said to be a three-terminal network since it comprises an input terminal 16, an output terminal 17, and the common or third terminal 18 which is usually a ground connection. While two connectors have been illustrated for connecting the conductive coating 11 to terminal 18, it will be appreciated that a single one may be utilized, if desired.

In considering the operating characteristics of the time-delay network, it is convenient to represent the network in the manner of Fig. 2. In this representation, the distributed inductance of winding 12 is shown as series-connected inductors $L_1$, $L_1$, and the distributed capacitance between the winding and its core structure is designated by shunt condensers $C_1$, $C_1$. This circuit arrangement, including series-connected inductors and shunt-connected condensers, essentially comprises a transmission line having a given total time delay. As will be made clear presently, the network is constructed, through appropriate proportioning of the conductive material of its core structure, to have a minimum attenuation over a given pass band for translating signal components included within a predetermined range of frequencies. By virtue of this feature, signal components included within a desired frequency range and applied to input terminal 16 are translated with minimum attenuation and distortion to output terminal 17.

In discussing the attenuation characteristics of the network of Figs. 1 and 2, the resistance of winding 12 will be neglected so that the attenuation to be minimized is determined largely by the eddy-current losses and the conduction-current losses of the core structure. The eddy-current losses are associated with the inductance of winding 12 and may be considered as occurring in the resistors $R_e$, $R_e$ shown in shunt relation with the series-connected inductors $L_1$, $L_1$ of Fig. 2. The conduction-current losses, on the other hand, are associated with the currents flowing through these inductors and the return path to ground and may be considered to occur in the resistors $R_c$, $R_c$ of Fig. 2. Since the magnitudes of both the eddy currents and the conduction currents are determined, at least in part, by the conductivity of coating 11 of core member 10, this coating is effective to determine the attenuation characteristic of the network and has a critical value for minimum attenuation which may be determined with the aid of the following expressions, in which:

$n$ = number of turns in winding 12
$a$ = radius of winding 12 (meters)
$b$ = length of winding 12 (meters)
$\mu$ = permeability of core structure 10, 11 (henries per meter)
$L$ = inductance of winding 12 (henries)
$R_1$ = surface resistivity of coating 11 (ohms per square)
$R$ = total conduction-current loss resistance of elements $R_c$ (ohms)
$R''$ = total eddy-current shunt loss resistance of elements $R_e$ (ohms)
$R'$ = total equivalent series resistance of shunt resistance $R''$ (ohms)
$R_s$ = total effective series resistance of conduction-current and eddy-current loss resistances in the network (ohms)
$\omega = 2\pi$ times the operating frequency
$\omega_m = 2\pi$ times the mid-frequency of the pass band of the network.

Consider first the case where a single low-impedance ground connection is provided for coating 11 of the core structure. That is, assume only the ground connection 14 to be present, then $$R_s = R + R' = R + \frac{\omega^2 L^2}{R''} \quad (1)$$

$$R = \frac{R_1 b}{2\pi a} \quad (2)$$

$$R'' = \frac{n^2 R_1 2\pi a}{b} \quad (3)$$

$$L = \frac{\mu n^2 \pi a^2}{b} \quad (4)$$

$$R_s = \frac{R_1 b}{2\pi a} + \frac{\omega^2 L^2 b}{R_1 n^2 2\pi a} \quad (5)$$

From Equations 1 and 5 it is seen that the attenuation caused by the conduction-current losses in R is independent of frequency, while that attributable to the eddy-current losses in R' varies directly as the square of the frequency. Also, it is to be noted that attenuation factors R and R' vary in opposite senses with variations in surface resistivity $R_1$. Thus, the total attenuation caused by $R_s$ may be minimized by selecting a value of surface resistivity which causes the factors R and R' to be equal at the mid-frequency of the pass band of the network. Where this condition is established:

$$R = R' \quad (6)$$

$$RR'' = \omega_m^2 L^2 \quad (7)$$

$$R_1 = \frac{\omega_m L}{n} = \frac{\omega_m \mu n \pi a^2}{b} \quad (8)$$

$$R = \frac{\omega_m \mu n a}{2} \quad (9)$$

$$R_s = 2R = \omega_m \mu n a \quad (10)$$

$$Q_{max} = \frac{\omega_m L}{R_s} = \frac{n \pi a}{b} \quad (11)$$

Equation 8 is an expression for the surface resistivity of coating 11 resulting in optimum attenuation and Q characteristics of the network. The expression includes only terms which are definitely known for a given network and permits the surface resistivity to be computed readily. Having determined the optimum surface resistivity to be provided, the selection of the conductive material of coating 11 dictates the thickness of coating to be employed. In other words, in accordance with the invention, the conductive material of the core structure is selected to have such conductivity and constitute such portion of the core structure that the above-defined relationship of eddy-current to conduction-current losses is obtained at the mid-frequency of the pass band of the network. For the specific embodiment under consideration, where the conductive material constitutes a thin coating applied to an insulated core, the conductivity and the thickness of the coating are selected to afford minimum attenuation and maximum Q.

An advantage is obtained by providing a plurality of low-impedance paths to ground from the core structure. This is demonstrated in the following expressions, computed on the assumption that both ground connections 14 and 15 are present. In such a case, the conduction currents are provided with two resistance paths which are in parallel and each half as long, so:

$$R = \frac{R_1 b}{8\pi a} \quad (12)$$

then, when the eddy-current and conduction-current losses are equal:

$$R_1 = \frac{2\omega_m \mu n \pi a^2}{b} \quad (13)$$

$$R = \frac{\omega_m \mu n a}{4} \quad (14)$$

$$R_s = \frac{\omega_m \mu n a}{2} \quad (15)$$

$$Q_{max} = \frac{2n\pi a}{b} \quad (16)$$

From a comparison of Equations 15 and 16 with Equations 10 and 11, it will be seen that the additional ground connection doubles the Q of the network and reduces its attenuation to one-half.

The Fig. 3 embodiment of the invention is generally similar to that of Fig. 1, corresponding components thereof being identified by the same reference characters. In Fig. 3, however, coating 11 has at least one thin axially extending or longitudinal slot 20. This construction is obtained by providing a similar slot in insulating member 10 before the application thereto of the coating 11, or by applying the coating and then cutting the slot. The presence of one or more longitudinal slots in the conductive coating modifies the eddy-current paths of the network by precluding a complete circumferential path around the core. The advantage of this construction is illustrated by the following approximate expressions for the minimum attenuation and maximum Q of the network, in which:

$m =$ number of longitudinal slots in the coating, and
$k =$ a constant slightly less than unity $$R = \frac{R_1 b}{2\pi a} \quad (17)$$

$$R'' = \frac{k^2 m^2 n^2 R_1 b}{2\pi a} \quad (18)$$

$$R_1 = \frac{\omega_m \mu n 2 \pi^2 a^3}{k m b^2} \quad (19)$$

$$R = \frac{\omega_m \mu n \pi a^2}{k m b} \quad (20)$$

$$R_s = \frac{2\omega_m \mu n \pi a^2}{k m b} \quad (21)$$

$$Q = \frac{k m n}{2} \quad (22)$$

As expressed by Equation 22, the Q of the network may be increased by increasing the number of axial slots in the conductive coating.

The foregoing derivations are predicated on the preferred condition that the eddy-current and conduction-current losses of the core structure are equal at the mid-frequency of the pass band of the network. Here, the term "mid-frequency" is intended to define the arithmetic mean of the limiting frequencies of the pass band.

Both experience and theory show that, while best results are obtained when the eddy-current and conduction-current losses are equal at the mid-frequency of the band, the advantages of this invention may be realized to a substantial degree if these losses are approximately equal. The term "approximately equal," as used in the description and appended claims, is intended to mean that one of the losses may be between 1.0 and 0.1 times the other. Where the attenuation factors are proportioned within the limits of this definition, the ratio of the actual Q to the maximum Q of the network, for any given embodiment of the invention, is greater than 0.57.

Terminals 16, 17 and 18 permit the described time-delay networks to be coupled, as desired, in a signal-translating system. The networks are subject to a wide variety of applications and may be utilized, for example, to obtain a desired time delay of applied transient signals. Also, through appropriate termination of the output circuit of the network, echoes or reflections of applied signals may be obtained, as with the well-known reflecting transmission-line arrangements. Additionally, the arrangements are particularly useful in pulse-generating systems, wherein the networks may serve to determine the duration and spacing of the generated pulses.

All of the time-delay networks described and illustrated have the advantages of an unbalanced or three-terminal arrangement. Furthermore, in view of the proportioning of the conductive material included in the core structures, these networks are not subject to the severe limitations encountered in unbalanced delay networks of the prior art.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention:

What is claimed is:

1. A time-delay network for translating signal components included within a predetermined range of frequencies comprising, an elongated structure including a conductive material, and an elongated winding insulated from but electrically coupled along its length to said structure to provide in said network a distributed capacitance comprising the capacitance between said structure and said winding for determining in conjunction with the inductance of said winding the time delay of said network, said conductive material having such conductivity and constituting such portion of said structure that the eddy-current losses in said conductive material are approximately equal to the conduction-current losses thereof at the mid-frequency of said range.

2. A time-delay network for translating signal components included within a predetermined range of frequencies comprising, an elongated core structure including a conductive material, and an elongated winding wound around and insulated from but electrically coupled along its length to said core structure to provide in said network a distributed capacitance comprising the capacitance between said core structure and said winding for determining in conjunction with the inductance of said winding the time delay of said network, said conductive material having such conductivity and constituting such portion of said core structure that the eddy-current losses in said conductive material are approximately equal to the conduction-current losses thereof at the mid-frequency of said range.

3. A time-delay network for translating signal components included within a predetermined range of frequencies comprising, an elongated core structure including a conductive material, and an elongated winding insulated from but electrically coupled along its length to said core structure to provide in said network a distributed capacitance comprising the capacitance between said core structure and said winding for determining in conjunction with the inductance of said winding the time delay of said network, said conductive material having such conductivity and constituting such portion of said core structure that the eddy-current losses in said conductive material are equal to the conduction-current losses thereof at the mid-frequency of said range.

4. A time-delay network for translating signal components included within a predetermined range of frequencies comprising, an elongated structure including a tubular member of insulating material having a thin peripheral coating of conductive material, and an elongated winding insulated from but electrically coupled along its length to said structure to provide in said network a distributed capacitance comprising the capacitance between said structure and said winding for determining in conjunction with the inductance of said winding the time delay of said network, said conductive coating having such conductivity and constituting such portion of said structure that the eddy-current losses in said conductive coating are approximately equal to the conduction-current losses thereof at the mid-frequency of said range.

5. A time-delay network for translating signal components included within a predetermined range of frequencies comprising, an elongated structure including a conductive material and having at least one axially extending slot, and an elongated winding insulated from but electrically coupled along its length to said structure to provide in said network a distributed capacitance comprising the capacitance between said structure and said winding for determining in conjunction with the inductance of said winding the time delay of said network, said conductive material having such conductivity and constituting such portion of said structure that the eddy-current losses in said conductive material are approximately equal to the conduction-current losses thereof at the mid-frequency of said range.

6. A time-delay network for translating signal components included within a predetermined range of frequencies comprising, an elongated structure including a tubular member of insulating material having a thin and axially slotted peripheral coating of conductive material, and an elongated winding insulated from but electrically coupled along its length to said structure to provide in said network a distributed capacitance comprising the capacitance between said structure and said winding for determining in conjunction with the inductance of said winding the time delay of said network, said conductive coating having such conductivity and constituting such portion of said structure that the eddy-current losses in said conductive coating are approximately equal to the conduction-current losses thereof at the mid-frequency of said range.

7. A time-delay network for translating signal components included within a predetermined range of frequencies comprising, an elongated supporting core structure including a tubular member of insulating material having a thin peripheral coating of conductive material over a major portion thereof, and an elongated winding wound over said coated portion and insulated from but electrically coupled along its length to said structure to provide in said network a distributed capacitance comprising the capacitance between said structure and said winding for determining in conjunction with the inductance of said winding the time delay of said network, said conductive coating having such conductivity and constituting such portion of said structure that the eddy-current losses in said conductive coating are approximately equal to the conduction-current losses thereof at the mid-frequency of said range.

8. A time-delay network for translating signal components included within a predetermined range of frequencies comprising, an elongated structure including a conductive material, an elongated winding insulated from but electrically coupled along its length to said structure to provide in said network a distributed capacitance comprising the capacitance between said structure and said winding for determining in conjunction with the inductance of said winding the time delay of said network, said conductive material having such conductivity and constituting such portion of said structure that the eddy-current losses in said conductive material are approximately equal to the conduction-current losses thereof at the mid-frequency of said range, and means having a substantially lower impedance than said structure and connected thereto at a plurality of points for providing a low-impedance path to ground from said structure.

9. A time-delay network for translating signal components included within a predetermined range of frequencies comprising, an elongated structure including a conductive material, an elongated winding insulated from but electrically coupled along its length to said structure to provide in said network a distributed capacitance comprising the capacitance between said structure and said winding for determining in conjunction with the inductance of said winding the time delay of said network, said conductive material having such conductivity and constituting such portion of said structure that the eddy-current losses in said conductive material are approximately equal to the conduction-current losses thereof at the mid-frequency of said range, and means having a substantially lower impedance than said structure and connected thereto near the opposite ends of said winding for providing a low-impedance path to ground from said structure.

HAROLD A. WHEELER.